W. M. MARSEILLES.
DEMOUNTABLE RIM.
APPLICATION FILED AUG. 10, 1916.

1,287,724.

Patented Dec. 17, 1918.

Witnesses

W. M. Marseilles,
Inventor by C. A. Snow & Co.
Attorneys

UNITED STATES PATENT OFFICE.

WILLIAM MERRITT MARSEILLES, OF CLINTON, MISSOURI.

DEMOUNTABLE RIM.

1,287,724.

Specification of Letters Patent. Patented Dec. 17, 1918.

Application filed August 10, 1916. Serial No. 114,270.

*To all whom it may concern:*

Be it known that I, WILLIAM M. MARSEILLES, a citizen of the United States, residing at Clinton, in the county of Henry and State of Missouri, have invented a new and useful Demountable Rim, of which the following is a specification.

The device forming the subject matter of this application is a demountable rim and the invention aims to provide novel means whereby the demountable rim may be interlocked with the main rim against movement circumferentially of the main rim, and against movement transversely of the main rim.

The invention aims to provide novel means whereby an expansion ring may be manipulated, to cause the same to connect and disconnect the main and demountable rims.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1:
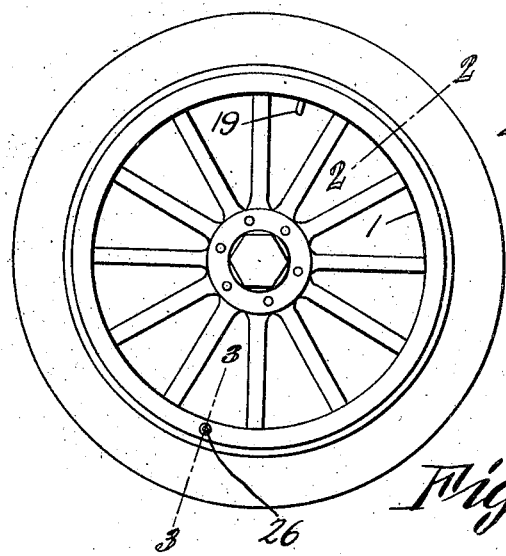
Figure 1 shows in side elevation, a vehicle wheel equipped with the device forming the subject matter of this application.

In the accompanying drawings, the numeral 1 indicates the main rim of a vehicle wheel, and a demountable rim is shown at 2, the rims 1 and 2 having coöperating beveled surfaces 3, whereby the demountable rim 2 may be slid transversely onto the main rim. The main rim 1 is provided at one side with a lip 4, constituting an abutment for the demountable rim 2. The rim 2 is prevented from creeping on the rim 1 by means of a lug 50 on the rim 1 received in a recess 51 in the rim 2. Any suitable means indicated at 5 may be provided, whereby the demountable rim 2 may be made to retain a tire, which, if desired, may include a casing 6 inclosing a tube 7. The specific means shown for assembling the tire with the demountable rim 2 may, of course, be changed without jeopardizing the utility of the invention.

Figure 4:
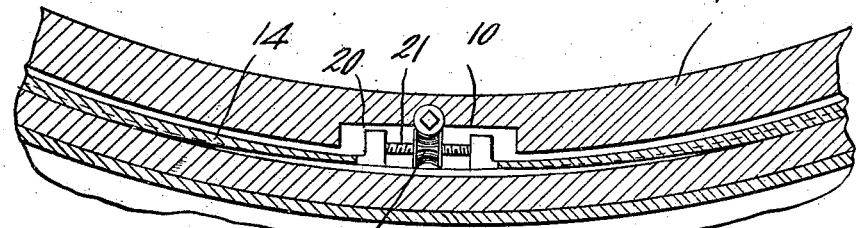
Fig. 4 is a fragmental longitudinal section taken approximately on the line 4—4 of Fig. 3.

In the outer surface of the main rim 1 there is formed a continuous circumscribing groove 8, a continuous circumscribing groove 9 being formed in the inner surface of the demountable rim 2. The grooves 8 and 9 are located to one side of the valve tube 19. As shown in Fig. 4, the main rim 1 is provided with a recess 10 communicating with the groove 8 in the main rim.

An expansible and contractible locking ring 14 is located in the grooves 8 and 9. At its ends, the ring 14 is provided with arms 20 which project into the recess 10 of the main rim 1. Projecting toward each other from the arms 20 are oppositely threaded screws 21. Threaded onto the screws 21 is a nut 22 which constitutes, in effect, a turnbuckle, the periphery of the nut 22 being fashioned into a worm wheel 23 adapted to coöperate with a worm 24 disposed transversely of the main rim 1 and journaled therein. The worm 24 is provided at one end with a squared head 25, adapted to receive a wrench (not shown), the head 25 of the worm 24 being located in a recess 26 formed in the side face of the main rim 1.

Figure 2:
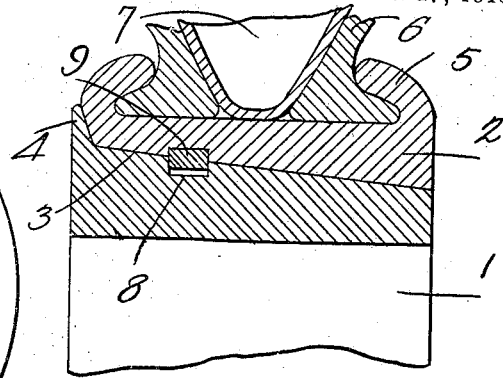
Fig. 2 is a cross section taken approximately on the line 2—2 of Fig. 1.
Figure 3:
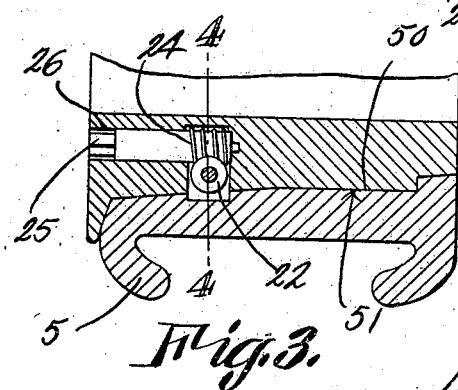
Fig. 3 is a cross section taken approximately on the line 3—3 of Fig. 1.
Figure 6:
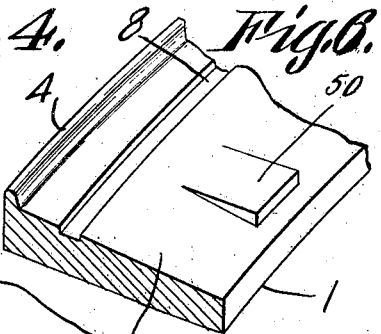
Fig. 6 is a fragmental perspective showing a portion of the main rim.
Figure 5:
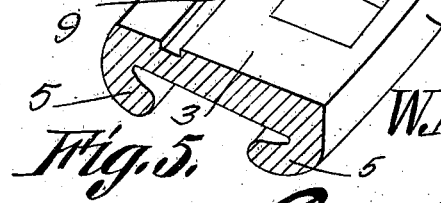
Fig. 5 is a fragmental perspective showing a portion of the demountable rim.

Let it be supposed that it is desired to mount the rim 2 on the rim 1. Under such circumstances, the worm 24 is rotated by means of the head 25, the worm 24 rotating the worm wheel 23 which constitutes a part of the nut 22. When the nut 22 is rotated, the screws 21 will be drawn toward each other, thus contracting the ring 14 so that the same is housed in the groove 8 of the main rim 1. Then, the demountable rim 2 may be slid transversely of the main rim 1, until the demountable rim abuts against the lip 4 on the main rim, as shown in Fig. 3. When the demountable rim 2 is slid onto the main rim 1 in the manner hereinbefore described, the lug 50 on the rim 1 is received in the recess 51 of the rim 2. A reverse rotation may now be imparted to the worm 24, whereupon the ring 14 will be expanded, and will register in the groove 9 of the demountable rim 2 and will be engaged, partially, in the groove 8 of the main rim 1, as indicated in Fig. 2. Under the circumstances above pointed out, the demountable rim 2 cannot slide transversely of the main rim 1, because these elements are locked together by the ring 14. Neither can the demountable rim 2 creep circumferentially of the main rim 1, because the parts 50 and 51 are interengaged.

Having thus described the invention, what is claimed is:—

In a device of the class described, a main rim and a demountable rim surrounding the main rim, the rims being provided with registering grooves, the main rim being supplied with an enlarged recess which communicates with the groove of the main rim, the main rim having a transverse passage which opens into the recess; an expansible locking ring engaged in the grooves and provided with rectangular arms extended into the recess; oppositely threaded screws mounted at their outer ends in the arms; a nut threaded for rotation on the inner ends of the screws and located in the recess, the nut being provided peripherally with a worm wheel; and a shaft journaled in the passage and provided at its inner end with a worm meshing into the worm wheel, the arms coöperating with the main rim at the ends of the recess to prevent the nut from being disengaged from the screws when the nut is rotated and when the demountable rim is removed from the main rim.

In testimony that I claim the foregoing as my own, I have hereto affixed my signature in the presence of two witnesses.

WILLIAM MERRITT MARSEILLES.

Witnesses:
M. S. CHURCH.
J. P. CANTRELL.